Patented Sept. 11, 1928.

1,683,729

UNITED STATES PATENT OFFICE.

ARTHUR L. RUSHTON, OF OMAHA, NEBRASKA, ASSIGNOR OF ONE-HALF TO MUNSON H. LANE, OF WASHINGTON, DISTRICT OF COLUMBIA.

PROCESS FOR RECOVERING BUTTER FROM BUTTERMILK.

No Drawing.   Application filed September 29, 1927.   Serial No. 222,945.

This invention relates to an improved process for recovering butter or butterfat from buttermilk or buttermilk whey derived from sour cream, and consists in passing such buttermilk or buttermilk whey through a centrifugal separator in which the liquid is exposed to centrifugal action for a much longer period of time than is found necessary for whole milk. A creamy substance is obtained by this operation, which may be termed "buttermilk cream", its percentage of butterfat being controlled by the length of time in which the liquid was exposed to centrifugal force in the separator.

It has been recognized that sour cream buttermilk contains butterfat, but the particles are in such fine division and the specific gravity of many of the globules so increased by reason of adhering and surrounding particles of casein that it has hitherto been found impossible to effect an efficient separation in the ordinary manner. Moreover, it is well known that the casein content of sour cream buttermilk precipitates easily. Attempts to separate butterfat from buttermilk result in the separator becoming rapidly clogged by the filling up of the pathways through the discs through which the buttermilk is distributed between the various discs. When these pathways are completely clogged, no more buttermilk can pass through and separation ceases.

In order to avoid this clogging action, I have devised a means which allows the separator to operate efficiently for a great deal longer time than with the ordinary cream separator, before complete clogging takes place and separation ceases. According to this feature of my invention, the pathways of the buttermilk through the discs are kept open for a much longer time by piercing the cover over the top disc of the separator with holes of approximately one-sixteenth inch diameter, preferably four in number, each hole being located directly over the corresponding pathway of the milk through the discs. These holes permit a small percentage of the buttermilk to escape through the separator into the skim milk, but serve to keep open the pathways of the remainder of the buttermilk so that a great deal more buttermilk may be separated before complete clogging takes place and separation ceases. Without this invention, the separator can be operated in treating buttermilk for only so short a time before separation ceases that separation in a commercial, practical way would be much less profitable, if at all.

I find that in sour cream buttermilk certain of the globules of butterfat are so enmeshed in casein that their specific gravity is greater than that of buttermilk and the globules are so very minute that they are therefore unrecoverable in the form of cream or thin milk by centrifugal force. The percentage of unrecoverable fat varies in different lots, but is estimated at seventy-four per cent of the total butterfat in the sour cream buttermilk. The remaining twenty-six per cent of the total butterfat in the sour cream buttermilk may be recovered by this invention in the form of cream of any desired practical percentage of butterfat.

In order to make the separation of butterfat from buttermilk commercially practicable, I find that it is desirable to eliminate at once the unseparable butterfat. This is accomplished by passing the buttermilk through a centrifugal separator at approximately the rate of inflow used for whole milk. With the untreated sour cream buttermilk testing on an average of sixty hundredths per cent butterfat, this results in the recovery from the cream outlet of approximately thirty per cent of the volume of the original buttermilk and testing approximately eighty hundredths per cent butterfat, or about forty per cent of the butterfat in the original sour cream buttermilk is obtained through the cream outlet in the form of a buttermilk testing about eighty hundredths per cent butterfat. This may be termed the primary separation and consists in dividing the butterfat into separable and non-separable portions. About twenty-six per cent of the butterfat content of the original sour cream buttermilk can be recovered by passing the thin milk obtained from the cream spout in the primary separation through a secondary separation in which the liquid is exposed to the centrifugal force of the separator for from six to twenty times as long as is required for efficient separation of the whole milk, depending on the per cent of fat desired in the cream.

It has been impossible heretofore to pass sufficient quantities of buttermilk through the separator before complete clogging took place and separation ceased. By the means of the holes drilled in the cover over the discs and directly over the pathways of the milk through the discs the time of the separator's efficient operation is more than doubled.

It has heretofore been found impossible to convert the thin buttermilk obtained from the cream outlet into cream of reasonable density for churning purposes without a loss of a greater part of the butterfat.

I find, however, that if this thin buttermilk is exposed for a considerably longer period of time, i. e., from six to twenty times that required for whole milk, to the centrifugal force exerted by the separator that the percentage of butterfat recovered is very greatly increased. The density of the cream obtained varies directly with the length of time it has been exposed to the action of centrifugal force in the separator. This is probably due to the much smaller size of the fat globules in buttermilk as compared to the fat globules in whole milk and to an increase in the specific gravity of the globules due to the adherence of a small amount of casein. The purpose of the centrifugal separator is, of course, to separate liquids of different specific gravities. In the case of whole milk, this is readily accomplished by exposing whole milk to the centrifugal force of the separator for approximately a minute or less. This period of exposure separates the cream from the skim milk very efficiently. However, to separate cream from buttermilk requires from six to twenty times as long as for whole milk, depending upon the percentage of fat desired in the cream.

In actual operation, a quantity of sour cream buttermilk is passed through a centrifugal separator at practically the rated inflow for whole milk. The cream screw is set to deliver approximately one fourth of the buttermilk passed through the separator in the form of a thin milk testing about eighty hundredths per cent butterfat as compared to about fifty-five hundredths per cent in the buttermilk from the skim outlet, based on a fat content of sixty hundredths per cent in the sour cream buttermilk. This process, the primary separation, separates the fat globules of low specific gravity from those of higher specific gravity that are probably unchurnable, due to adhering and enveloping casein.

The thin milk obtained from the cream spout in the primary separation is next passed through the centrifugal separator at from one sixth to one twentieth the normal rated inflow for whole milk. The continued exposure to centrifugal force gradually concentrates the globules of butterfat into a cream herein termed "buttermilk cream," the fat content of which varies with the time of exposure to the centrifugal force of the separator. The cream obtained from the cream spout in this separation, referred to as the secondary separation, is of good quality and may be then churned into a reasonably good quality of butter.

By this process, approximately twenty-six per cent of the butterfat content of sour cream buttermilk may be obtained at the end of the secondary separation in the form of cream testing 20% or more butterfat, as compared to less than two per cent of cream testing over twenty per cent if the rated inflow for whole milk is used for either primary or secondary separations or both. This makes possible the commercial and profitable recovery of valuable butterfat as cream from sour cream buttermilk.

What I claim is:—

1. A substantially continuous process for treating sour cream buttermilk or buttermilk whey to recover a portion of the butter fat thereof, which consists in subjecting sour cream buttermilk or buttermilk whey to a preliminary treatment for preventing clogging in a subsequent centrifugal treatment and then subjecting the product to a centrifugal force for a substantially longer period of time than that which is necessary for whole milk separation.

2. A substantially continuous process for treating sour cream buttermilk or buttermilk whey to recover a portion of the butter fat thereof, which consists in subjecting sour cream buttermilk or buttermilk whey to a preliminary treatment for preventing clogging in a subsequent centrifugal treatment and then subjecting the product to a centrifugal force for a period approximately six to twenty times that which is necessary for whole milk separation.

3. A process for treating sour cream buttermilk or buttermilk whey to recover a portion of the butter fat thereof, which consists in effecting a primary separation to separate the recoverable from the non-recoverable fat portions, the primary separation consisting in passing the butter milk or buttermilk whey through a centrifugal separator at approximately the same rate used for separting the cream from whole milk, recovering the fluid emerging from the cream outlet of the separator, then effecting a secondary separation by passing such recovered fluid through a cream separator at a substantially less rate than that employed in treating whole milk.

4. A process for treating sour cream buttermilk or buttermilk whey to recover a portion of the butter fat thereof, which consists in effecting a primary separation to separate the recoverable from the non-recoverable fat portions, the primary separation consisting in passing the buttermilk or buttermilk whey through a centrifgual separator at approximately the same rate used for separating the cream from whole milk, recovering the fluid emerging from the cream outlet of the separator, then effecting a secondary separation by passing such recovered fluid through a cream separator at a substantially less rate than that employed in treating whole milk, recovering "buttermilk cream" from the cream outlet, then churning said buttermilk cream to obtain butter.

In testimony whereof I affix my signature.

ARTHUR L. RUSHTON.